United States Patent
Bezzi

(10) Patent No.: US 10,963,474 B2
(45) Date of Patent: Mar. 30, 2021

(54) AUTOMATIC DISCRIMINATORY PATTERN DETECTION IN DATA SETS USING MACHINE LEARNING

(71) Applicant: SAP SE, Walldorf (DE)

(72) Inventor: Michele Bezzi, Le Haut Sartoux Valbonne (FR)

(73) Assignee: SAP SE, Walldorf (DE)

( * ) Notice: Subject to any disclaimer, the term of this patent is extended or adjusted under 35 U.S.C. 154(b) by 781 days.

(21) Appl. No.: 15/655,753

(22) Filed: Jul. 20, 2017

(65) Prior Publication Data

US 2019/0026345 A1    Jan. 24, 2019

(51) Int. Cl.
| | | |
|---|---|---|
| *G06F 16/00* | (2019.01) | |
| *G06F 16/2458* | (2019.01) | |
| *G06F 16/28* | (2019.01) | |
| *G06F 16/951* | (2019.01) | |
| *G06K 9/62* | (2006.01) | |
| *G06Q 10/06* | (2012.01) | |

(52) U.S. Cl.
CPC ........ *G06F 16/2465* (2019.01); *G06F 16/285* (2019.01); *G06F 16/951* (2019.01); *G06K 9/6234* (2013.01); *G06Q 10/06* (2013.01)

(58) Field of Classification Search
CPC .. G06F 16/2465; G06F 16/285; G06F 16/951; G06K 9/6234; G06K 9/6227; G06K 9/6228; G06K 9/623; G06K 9/6235; G06Q 10/06; G06Q 40/02; G06Q 40/025
USPC ..................................................... 707/694
See application file for complete search history.

(56) References Cited

U.S. PATENT DOCUMENTS

| | | | | |
|---|---|---|---|---|
| 6,606,615 B1* | 8/2003 | Jennings | ........... | G06Q 10/06 |
| | | | | 706/45 |
| 7,805,345 B2* | 9/2010 | Abrahams | ........... | G06Q 40/025 |
| | | | | 705/35 |
| 8,364,588 B2* | 1/2013 | Celka | ........... | G06Q 40/00 |
| | | | | 726/23 |
| 8,935,198 B1* | 1/2015 | Phillips | ........... | G06Q 40/00 |
| | | | | 706/62 |
| 2005/0289166 A1* | 12/2005 | Stanley | ........... | G06F 16/20 |
| | | | | 707/999.1 |
| 2007/0050286 A1* | 3/2007 | Abrahams | ........... | G06Q 40/00 |
| | | | | 705/38 |

(Continued)

OTHER PUBLICATIONS

Evan Archer, Il Memming Park, and Jonathan W Pillow. Bayesian entropy estimation for countable discrete distributions. The Journal of Machine Learning Research, 15(1):2833-2868, (2014).

(Continued)

*Primary Examiner* — Vincent F Boccio
(74) *Attorney, Agent, or Firm* — Jones Day

(57) ABSTRACT

A front end receives a request for data specifying a data type. A query handler retrieves data of the data type comprising a plurality of data records from at least one database. The query handler assigns a classification attribute to each data record using a pre-defined classification policy stored in a policy store. A discrimination detection engine statistically evaluates the classification attributes for the data to identify a mutual information metric. The query handler generates a listing of one or more discriminatory attributes and corresponding mutual information metric contributing to discriminatory data patterns based on the mutual information metric.

20 Claims, 6 Drawing Sheets

(56) References Cited

U.S. PATENT DOCUMENTS

2008/0306750 A1* 12/2008 Wunder ............. G06Q 10/10
705/1.1

OTHER PUBLICATIONS

Michele Bezzi. Quantifying the information transmitted in a single stimulus. Biosystems, 89(1):4-9, (2007).

Toon Calders and Sicco Verwer. Three naive bayes approaches for discrimination-free classification. Data Mining and Knowledge Discovery, 21(2):277-292, 2010.

Employee Charge Trends Across the United States (2015). www.hiscox.com/shared-documents/The-2015-Hiscox-Guide-to-Employee-Lawsuits-Employee-charge-trends-across-the-United-States.pdf.

Sara Hajian, Josep Domingo-Ferrer, and Oriol Fans. Generalizationbased privacy preservation and discrimination prevention in data publishing and mining. Data Mining and Knowledge Discovery, 28(5-6):1158-1188, 2014.

Toshihiro Kamishima, Shotaro Akaho, Hideki Asoh, and Jun Sakuma. Fairness-Aware Classifier with Prejudice Remover Regularizer, pp. 35-50. Springer Berlin Heidelberg, Berlin, Heidelberg, 2012.

Oecd: The economic cost of gender-based discrimination in social institutions (2016). www.oecd.org/dev/development-gender/SIGI_cost_final.pdf.

Andrea Romei and Salvatore Ruggieri. A multidisciplinary survey on discrimination analysis. The Knowledge Engineering Review, 29(5):582638, Nov. 2014.

Alexander Strehl and Joydeep Ghosh. Cluster ensembles|a knowledge reuse framework for combining multiple partitions. The Journal of Machine Learning Research, 3:583-617, 2003.

* cited by examiner

AUTOMATIC DISCRIMINATORY PATTERN DETECTION IN DATA SETS USING MACHINE LEARNING

TECHNICAL FIELD

The subject matter described herein relates to the use of machine learning to automatically detect and characterize discriminatory patterns in data sets.

BACKGROUND

Large and diverse data sets are increasingly being used by businesses. Such data sets can include, for example, human resource information, customer information, transactions, demographics, or product ratings. Businesses can use statistical and machine learning techniques to support business decisions, such as credit scoring, employment applications, salary and bonus allocation, or workforce planning. When using large data sets to make various business decisions, direct and/or indirect discrimination can occur. Direct discrimination can occur when rules or practices resulting in treating individuals of a protected group differently. Indirect discrimination can occur when neutral practices rely on attributes that are correlated to protected attributes.

SUMMARY

In one aspect, discriminatory data patterns are determined by receiving, at a front end, a request for data specifying a data type. A query handler retrieves, from at least one database, data of the data type including a plurality of data records. The query handler assigns a classification attribute to each data record using a pre-defined classification policy stored in a policy store. A discrimination detection engine statistically evaluates the classification attributes to identify a mutual information metric. In some variations, the mutual information metric can be a normalized mutual information metric. The query handler generates a listing of one or more discriminatory attributes and corresponding mutual information metrics contributing to discriminatory data patterns based on the mutual information metric.

In some variations, the classification attributes include at least one of (i) a potentially discriminatory attribute including information identifying a protected group (ii) a potentially non-discriminatory attribute including information unrelated to a protected group, or (iii) a decision attribute including predetermined decision information relating to the request. In other variations, statistically evaluating the classification attributes can include statistically estimating, by a direct discrimination engine of the discrimination detection engine, the mutual information metric based on the decision attributes and the potentially discriminatory attributes given the potentially non-discriminatory attributes. The mutual information metric can be compared by the direct discrimination detection engine to a predetermined threshold. The listing can further include the potentially discriminatory attributes when the mutual information metric exceeds the predetermined threshold.

In other variations, statistically evaluating the classification attributes can include statistically estimating, by an indirect discrimination engine of the discrimination detection engine, the mutual information metric based on the decision attributes and the potentially non-discriminatory attributes. The indirect discrimination engine can compare the mutual information metric to a predetermined threshold and the listing can further include the potentially non-discriminatory attributes when the mutual information metric exceeds the predetermined threshold. In some variations, an external sources inference engine of the discrimination detection engine can statistically evaluate the mutual information metric based on the decision attributes and the potentially discriminatory attributes stored in an external database. The indirect discrimination engine can compare the mutual information metric to a predetermined threshold and the listing can further include dependencies of the potentially discriminating attributes on external source data.

In some variations, a user can define the classification attributes of the pre-defined classification policy. In other variations, an explanatory factors finder can automatically define the pre-defined classification policy by extracting unclassified attributes of the plurality of data records. A mutual information metric can be statistically evaluated based on the decision attributes. The mutual information metric can be compared to a predetermined threshold and the pre-defined classification policy can include the potentially non-discriminatory attributes having the mutual information metric that exceeds the predetermined threshold.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides for automatic discrimination detection of large data sets based on machine learning techniques. Both direct and indirect discriminatory attributes within data can be identified and provided to a user using statistical evaluations. Such automatic processing can be integrated within a wide range of applications and data sets.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The modular system architecture of the current subject matter can provide for the detection of discriminatory patterns in large data sets by quantifying possible discriminatory dependencies. The outcome of the analysis can provide a quantitative support tool for decision makers to detect and, eventually, mitigate discriminatory behavior. Complex discriminatory patterns in large data sets can be discovered, supporting both direct and indirect discrimination, based on a single attribute or a combination of attributes. Such a system can be implemented in in-memory and column-based database platforms which can provide real-time detections of discriminatory patterns. Such a model can also detect the presence of a favorable treatment for specific protected groups or mixed cases.

Figure 1:
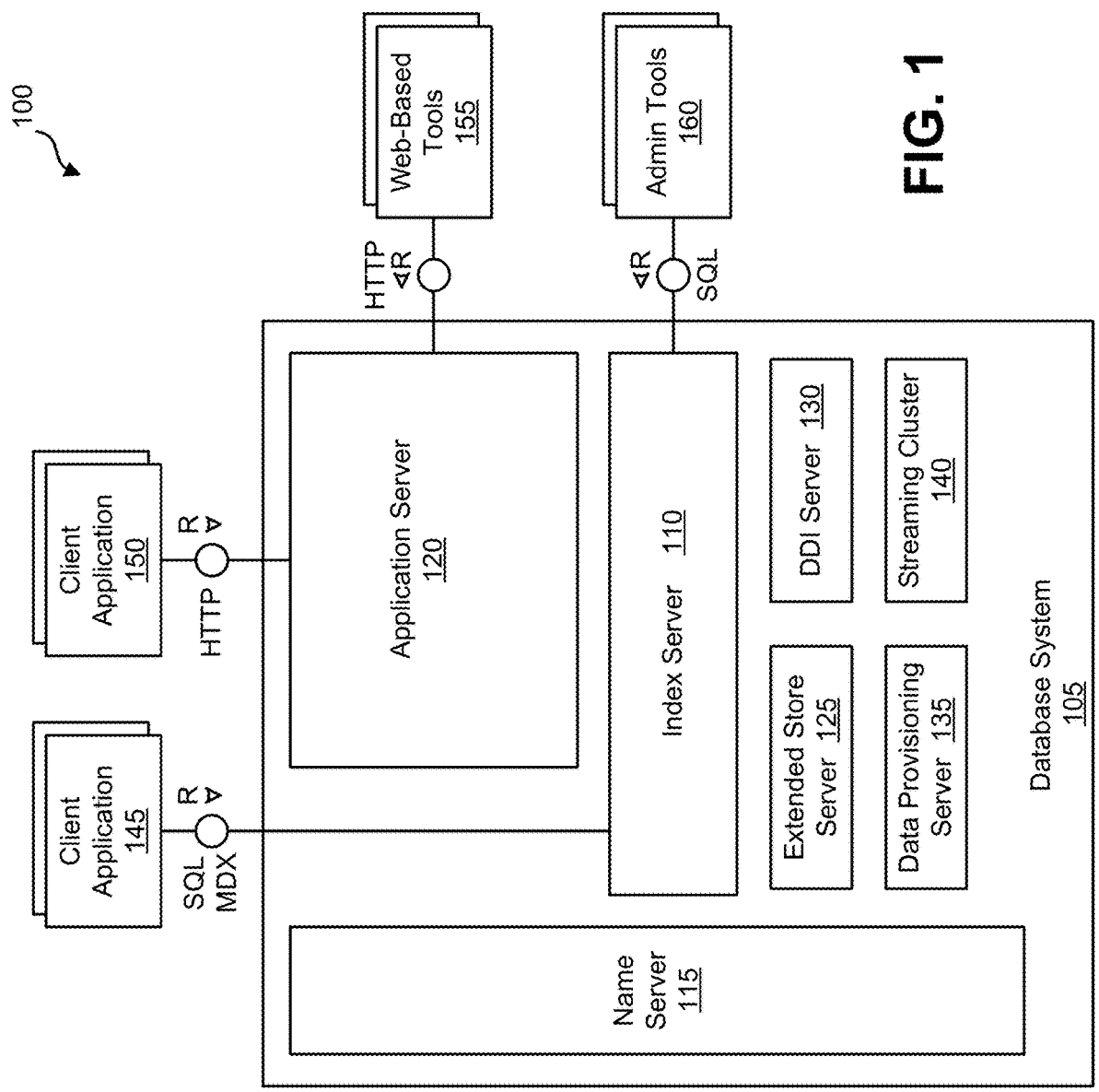
FIG. 1 is a system diagram illustrating an example database system for use in connection with the current subject matter.

FIG. 1 is a diagram 100 illustrating a database system 105 that can be used to implement aspects of the current subject matter. The database system 105 can, for example, be an in-memory database in which all relevant data is kept in main memory so that read operations can be executed without disk input output (I/O) and in which disk storage is required to make any changes durables. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also used to run web-based tools 155 for administration, life-cycle management, and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
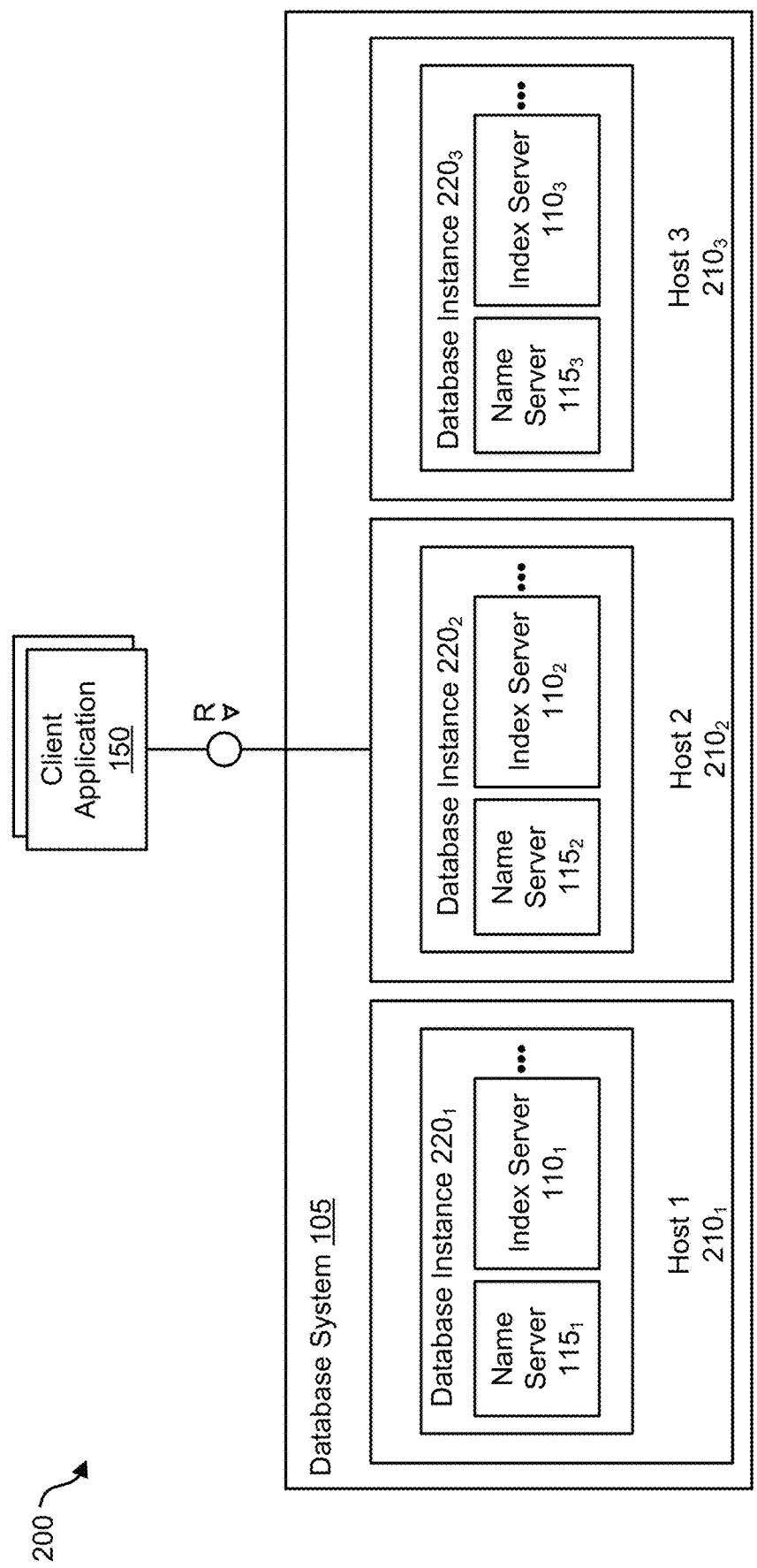
FIG. 2 is a system diagram illustrating a distributed database system having a plurality of database instances.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers 110$_{1-3}$, 120$_{1-3}$, in the system, if required.

As is illustrated in FIG. 2, the distributed database system 105 can be installed on more than one host 210$_{1-3}$. Each host 210$_{1-3}$ is a machine that can comprise at least one data processor (e.g., a CPU, etc.), memory, storage, a network interface, and an operation system and which executes part of the database system 105. Each host 210$_{1-3}$ can execute a database instance 220$_{1-3}$ which comprises the set of components of the distributed database system 105 that are installed on one host 210$_{1-3}$. FIG. 2 shows a distributed system with three hosts, which each run a name server 110$_{1-3}$, index server 120$_{1-3}$, and so on (other components are omitted to simplify the illustration).

Figure 3:
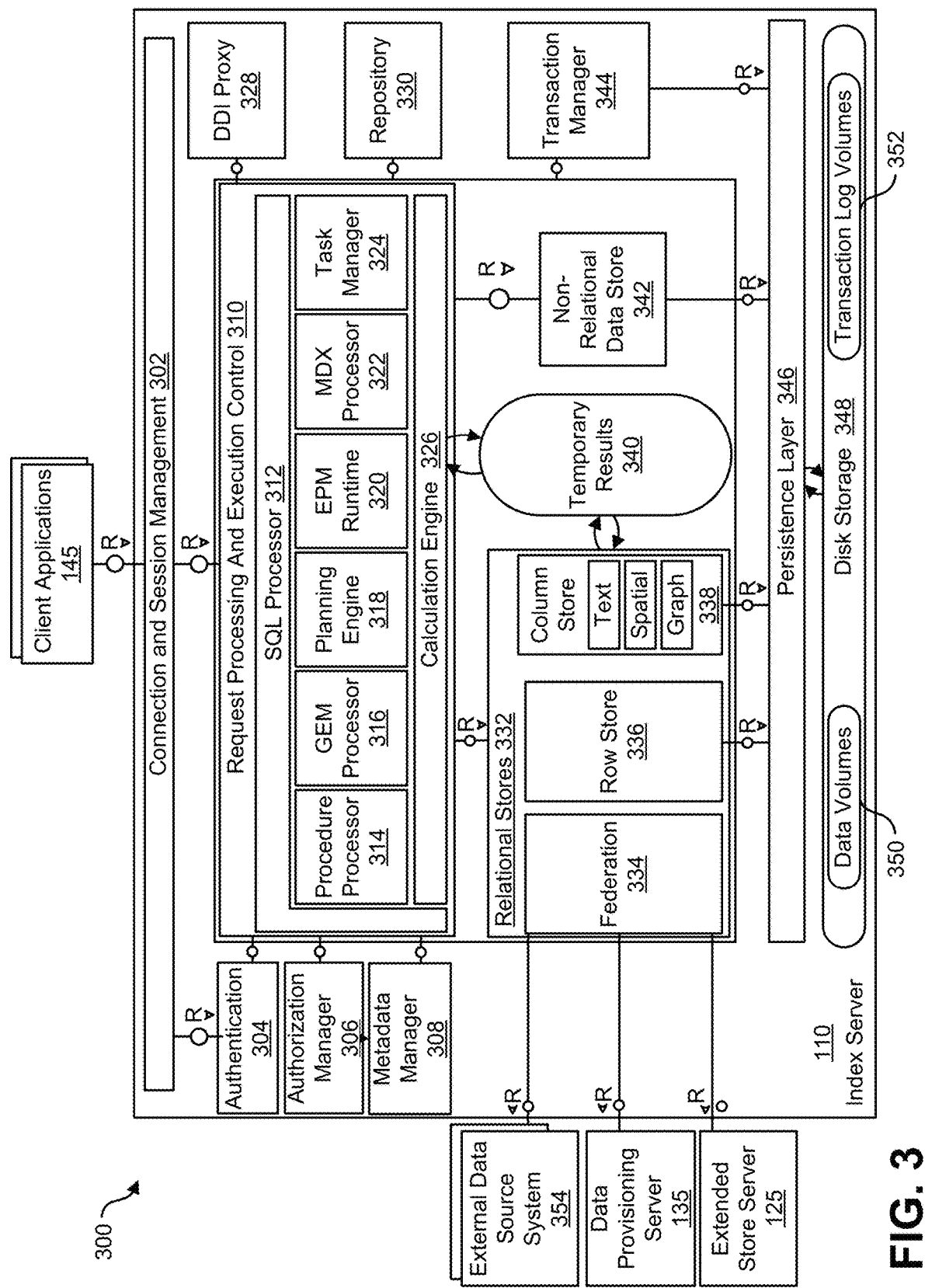
FIG. 3 is a system diagram of an index server forming part of the database system of FIG. 1.

FIG. 3 is a diagram 300 illustrating an architecture for the index server 110 (which can, as indicated above, be one of many instances). A connection and session management component 302 can create and manage sessions and connections for the client applications 145. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 145 using the same network communication protocol. GEM statements can be sent using a built-in SQL system procedure.

The index server 110 can include an authentication component 304 that can be invoked with a new connection with a client application 145 is established. Users can be authenticated either by the database system 105 itself (login with user and password) or authentication can be delegated to an external authentication provider. An authorization manager 306 can be invoked by other components of the database system 145 to check whether the user has the required privileges to execute the requested operations.

Each statement can be processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can forwarded to a task manager 324 (which can be part of a larger task framework). Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can store relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead, it is built using the column store 338, which can have a dedicated graph API.

The row store 336 can store relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extends transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and savepoints. The persistence layer 346 can provide interfaces for writing and reading persisted data and it can also contain a logger component that manages a transaction log. Transaction log entries can be written explicitly by using a log interface or implicitly when using the virtual file abstraction.

The persistence layer 236 stores data in persistent disk storage 348 which, in turn, can include data volumes 350 and/or transaction log volumes 352 that can be organized in pages. Different page sizes can be supported, for example, between 4k and 16M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

Figure 4:
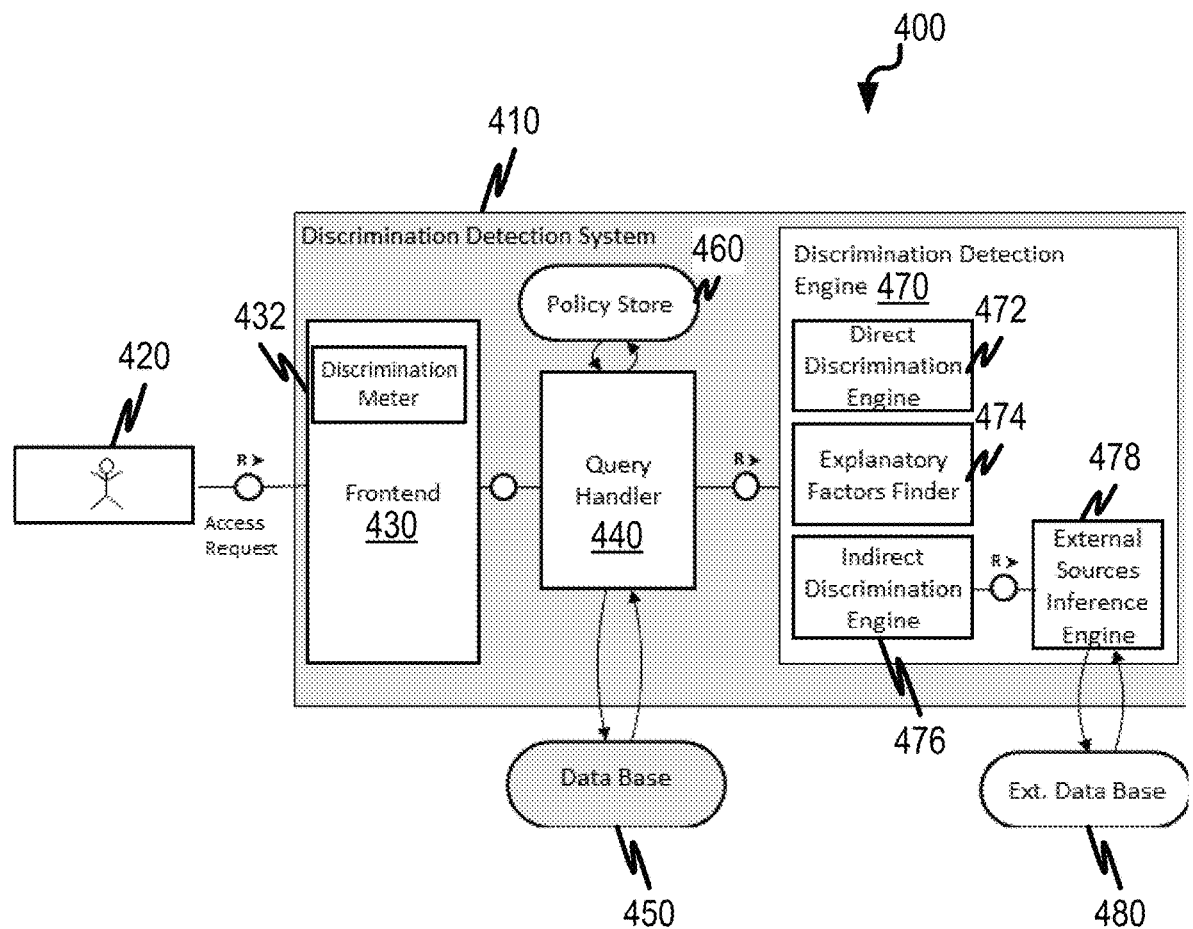
FIG. 4 is an example system architecture for use in connection with the current subject matter.

FIG. 4 is an example system architecture 400 for use in connection with the current subject matter. A discrimination detection system 410 accepts a request that can be, for example, a query or an access request from one or more users 420. The request can be for data by specifying a data type. For example, a user 420 can request human resource data, student records from a university database, or credit records for a bank database. A front end 430 receives the user request for processing via a graphical user interface element. The graphical user interface element can include discrimination meter 432 which can provide information to user 420 regarding the level of discrimination and/or list of specific attributes contributing to discriminatory data patterns.

The front end 430 interfaces with a query handler 440. Query handler 440 acts as a dispatcher that connects the front end 430 to backend data storage, for example, database 450. Query handler 440 can receive the request for data from front end 430 and retrieve data of the data type specified in the request from database 450. The data retrieved can include a plurality of data records pertaining to the request. An example data table can be found in Table 1.

TABLE 1

Example Human Resources table with non-potentially discriminatory attributes (X), potentially discriminatory attributes (S), and decision attributes (Y).

| ID | Level $(X_1)$ | Zip Code $(X_2)$ | Sex (S) | Promotion $(Y_1)$ | Salary $(Y_2)$ |
|---|---|---|---|---|---|
| 1 | Senior | 41042 | M | Yes | 48000 |
| 2 | Senior | 41022 | M | Yes | 41000 |
| 3 | Senior | 41042 | M | No | 71000 |
| 4 | Senior | 29501 | M | Yes | 54000 |
| 5 | Junior | 29504 | F | No | 30000 |
| 6 | Junior | 29506 | F | Yes | 20000 |
| 7 | Senior | 97439 | F | No | 44300 |

Query handler 440 can also interact with policy store 460. Policy store 460 can store one or more classification policies. A classification policy, for example, lists data attributes categorized in specific categories (e.g., potentially discriminatory attributes, potentially non-discriminatory attributes, and decision attributes). In one example policy, potentially discriminatory attributes, S, can include data that identifies membership to a protected group which can be directly used for discrimination (e.g., race, color, religion, nationality, sex, marital status, age, or pregnancy). Potentially non-discriminatory attributes, X, can include data that is unrelated to membership of a protected group (e.g., home address or a position in a company). Decision attributes, Y, can be the outcome or basis of a decision (e.g., approval of a credit, being short-listed for a promotion or job, or a salary level). Such a decision may or may not have discriminatory impacts.

A user 420 can define one or more existing classification policies using a graphical user interface of the front end 430. Additionally, one or more policies stored in policy store 460 can be viewed by user 420 using front end 430. Classification policies can also be automatically defined by explanatory factors finder 474 of discrimination detection engine 470. Query handler 440 assigns a classification attribute to each data record of the data retrieved from database 450 using a classification policy stored in policy store 460.

In the event that user 420 and/or the classification policy from policy store 460 does not provide potentially non-discriminatory attributes, explanatory factors finder 474 can automatically determine candidate potentially non-discriminatory attributes and generate a new policy or policies including such attributes. Explanatory factors finder 474 can receive a data table and default policy from query handler 440. Explanatory factors finder 474 extracts a list of non-classified attributes $\tilde{X}$ from the input data table. The impact on the decision attribute of remaining non-classified attributes $\tilde{X}$ are computed by evaluating for each attribute $\tilde{X}_i$ within a set of attributes $\tilde{X}$ (e.g., $\tilde{X}_i \in \tilde{X}$), a mutual information metric $I(S, \tilde{X}_i)$. If the mutual information metric or a normalized version of the mutual information metric exceeds a predetermined threshold, the non-classified attribute is added to a new set of potentially non-discriminatory attributes $X_f$. A new policy or policies which include the set of potentially non-discriminatory attributes $X_f$ is returned by explanatory factors finder 474 to query handler 440. The new policy or policies can be provided by query handler 440 to policy store 460 for storage.

Query handler 440 also interfaces with discrimination detection engine 470 to detect discrimination within the retrieved data table. The classification attributes assigned to the data are statistically evaluated to identify mutual information metrics or normalized mutual information metrics using discrimination detection engine 470. Mutual information is a symmetric measure of dependencies between random variables, for example, X and Y. If, for example, two random variables are independent of one another, the following equation is satisfied:

$$I(X,Y)=0 \quad (1)$$

Possible discriminatory impacts can be estimated using the mutual information between a decision attribute and the potentially discriminatory and potentially non-discriminatory attributes $I(\{X, S\}, Y)$, which, following the information chain rule can be a combination of two metrics:

$$I(\{X,S\},Y)=I(X,Y)+I(Y,S|X) \quad (2)$$

In some variations, a mutual information metric may be normalized between 0 and 1. Such a normalization technique will be described in detail to follow.

Both potentially discriminatory attribute and potentially non-discriminatory attribute analyzers can include computationally expensive statistical analysis and iterative access and manipulation of potential large data sets. On-the-fly execution of such iteration can be achieved by using working tables (e.g., temporary store) in an in-memory database system. Data manipulation and compression algorithms that are optimized for column-storage and that are fundamental elements of the computation of these statistical quantities can increase performance of the subject matter described herein.

Mutual information can be defined as:

$$I(X, Y) = \sum_{x \in X} \sum_{y \in Y} P(x, y) \log_2 \frac{P(x, y)}{P(y)P(x)} \quad (3)$$

where x is a variable in set X, y is a variable in set Y, P(x,y) is the joint probability of having x and y occur, P(x) is the probability that x occurs, P(y) is the probability that y occurs. Equation (3) can be written in terms of conditional probability P(x|y), using Bayes' formula which states:

$$P(x,y)=P(x|y)P(y) \quad (4)$$

which can result in $$I(X, Y) = \sum_{y \in Y} P(y) \sum_{x \in X} P(x|y) \log_2 \frac{P(x|y)}{P(x)} = \sum_{y \in Y} P(y) I_s(X, y) \quad (5)$$

where $I_s$ represents one-symbol surprise information defined as:

$$I_s(X, y) = \sum_{x \in X} P(x|y) \log_2 \frac{P(x|y)}{P(x)} \quad (6)$$

The conditional mutual information $I(X, Y|Z)$, where Z is a variable, can be defined as:

$$I(X, Y | Z) = \sum_{z \in Z} P(z) \sum_{x \in X} \sum_{y \in Y} P(x, y | z) \log_2 \frac{P(x, y | z)}{P(y | z) P(x | z)} \quad (7)$$

which can also be expressed as:

$$I(X,Y|Z) = \sum_{z \in Z} P(z) \sum_{y \in Y} P(y|z) I_s(X, y|z) \quad (8)$$

where:

$$I_s(X, y | z) = \sum_{x \in X} P(x | y, z) \log_2 \frac{P(x | y, z)}{P(x | z)} \quad (9)$$

The probabilities can be estimated based on frequency histograms derived from the data. With small data sets, more complex methods can be used to reduce sampling bias. The upper bound of mutual information can be the minimum between the Shannon Entropy of the two random variables represented by:

$$I(X,Y) \leq \min(H(X), H(Y)) \quad (10)$$

where H(X) represents the entropy of data set X and H(Y) represents the entropy for data set Y.

Mutual information metrics can also be normalized between 0 and 1. In one example, a normalized mutual information $I_N(X,Y)$ can be determined using:

$$I_N(X, Y) = \frac{I(X, Y)}{\sqrt{H(X)H(Y)}}. \quad (11)$$

Equation (11) represents one of many normalization methods which can be utilized in connection with the current subject matter.

Discrimination detection engine 470 includes direct discrimination engine 472, explanatory factors finder 474, indirect discrimination engine 476, and external sources inference engine 478. Direct discrimination engine 472 provides an estimated impact of the potentially discriminatory attributes, S, on the decision attribute, Y (e.g., direct discrimination). As input, the direct discrimination engine 472 receives a data table from query handler 440. The data table can include the plurality of data records retrieved from database 450 and a default policy stored in policy store 460. For each data record having an assigned potentially discriminatory attribute $S_i$ within the data set S (e.g., $S_i \in S$), a mutual information metric $I(Y, S_i|X)$ is determined. The mutual information metric can be compared to a predetermined threshold. Exceeding the predetermined threshold classifies the attribute as a candidate for direct discrimination. A list of attributes classified for direct discrimination $S' \subseteq S$ that exceed the predetermined thresholds and the corresponding mutual information metrics $I(Y, S_i'|X)$ are added to an alert list.

Indirect discrimination engine 476 provides an estimated impact of potentially non-discriminatory attributes, X, on the decision attribute, Y (e.g., indirect discrimination). As input, the indirect discrimination engine 476 receives a data table from query handler 440. The data table can include the plurality of data records retrieved from database 450 and a default policy stored in policy store 460. For each potentially non-discriminatory attribute $X_i$ within the data set X (e.g., $X_i \in X$), a mutual information metric $I(Y, X_i)$ is determined. The mutual information metric can be compared to a predetermined threshold. Exceeding the predetermined threshold classifies the attribute as a candidate for indirect discrimination. A list of attributes classified for indirect discrimination $X' \subseteq X$ that exceed the predetermined thresholds and the corresponding mutual information metrics $I(Y, S_i'|X)$ are added to an alert list returned back to query handler 440.

In some variations, prior to returning the list of indirect discrimination attributes, indirect discrimination engine 476 interfaces with external sources inference engine 478 to evaluate dependencies of the identified indirect discrimination attributes X' on the potentially discriminatory attributes, S. Indirect discrimination engine 476 provides a data set including the potentially discriminatory attributes S and indirect discrimination attributes X' to external sources inference engine 478. External sources inference engine 478 interfaces with an external database 480 to extract a table of external data (e.g., census data) and computes a mutual information metric $I(Y, S_i')$. The mutual information metric $I(Y, S_i')$ is then provided by external sources inference engine 478 to indirect discrimination engine 476. In cases where some attributes have no corresponding data within external database 480, a 'not applicable' value will be returned. A list of attributes classified as having indirect discrimination $X' \subseteq X$ which exceed the predetermined thresholds along with corresponding mutual information metrics $I(Y, X_i')$ and metric $I(Y, S_i')$, if available, are added to an alert list. Discrimination detection engine 470 provides the alert to query handler 440.

The alert list having attributes identified as direct discrimination and/or indirect discrimination candidates are provided from query handler 440 to front end 430. The alert list can be displayed to user 420 via discrimination meter 432. User 420 can use this information, for example, in deciding if the identified attributes are related to a business necessity and are acceptable or if there is actual discrimination.

Figure 5:
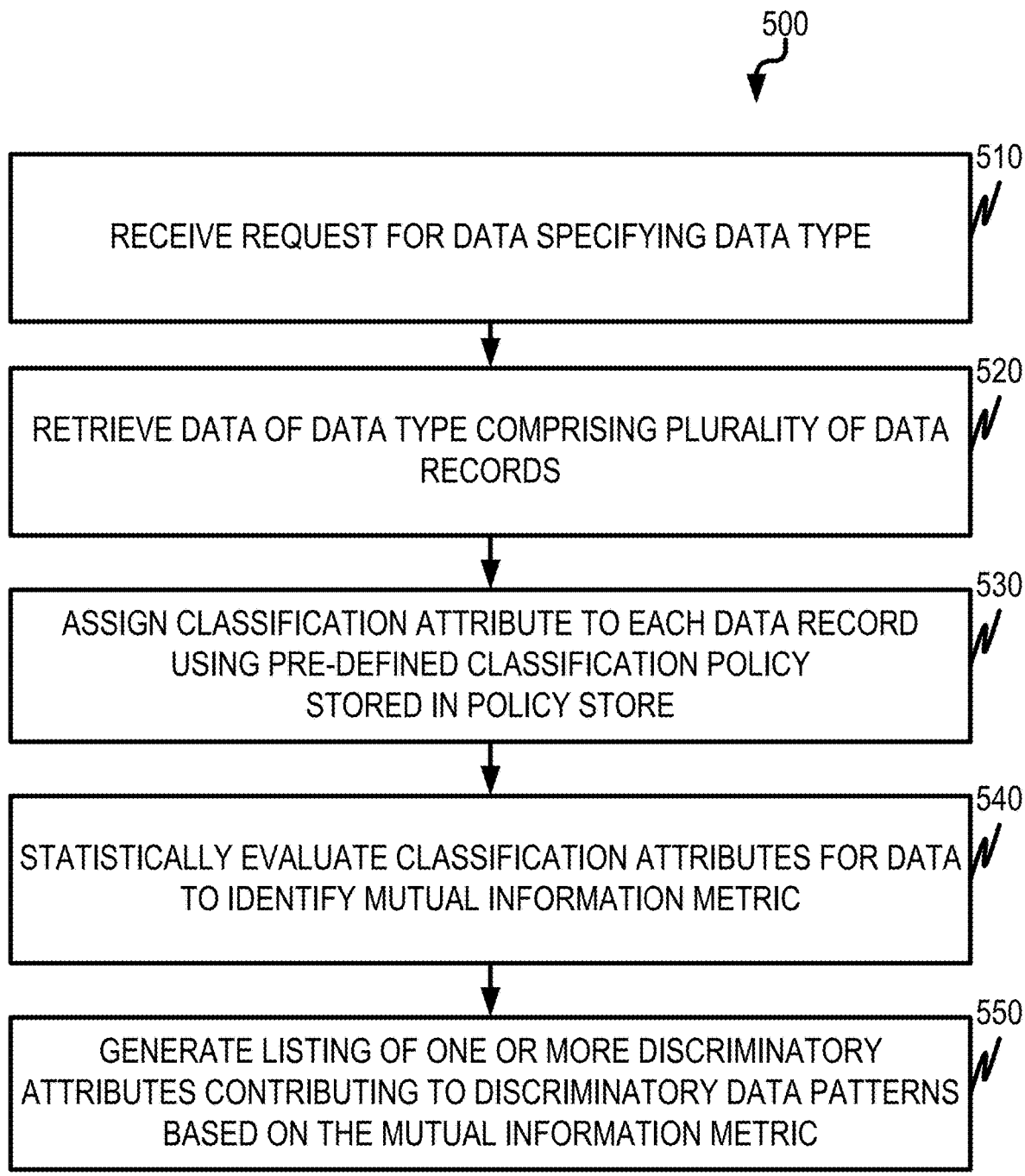
FIG. 5 is an example process flow diagram for determining discriminatory data patterns.

FIG. 5 is an example flow diagram 500 for determining discriminatory data patterns. A request for data specifying a data type is received, at 510. Data of the data type comprising a plurality of data records is retrieved, at 520, from a database. A classification attribute is assigned, at 530, to each data record using a pre-defined classification policy stored in a policy store. The classification attributes for the data are statistically evaluated, at 540, to identify a mutual information metric. A listing of one or more discriminatory attributes contributing to discriminatory data patterns are generated, at 550, based on the mutual information metric.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 6:
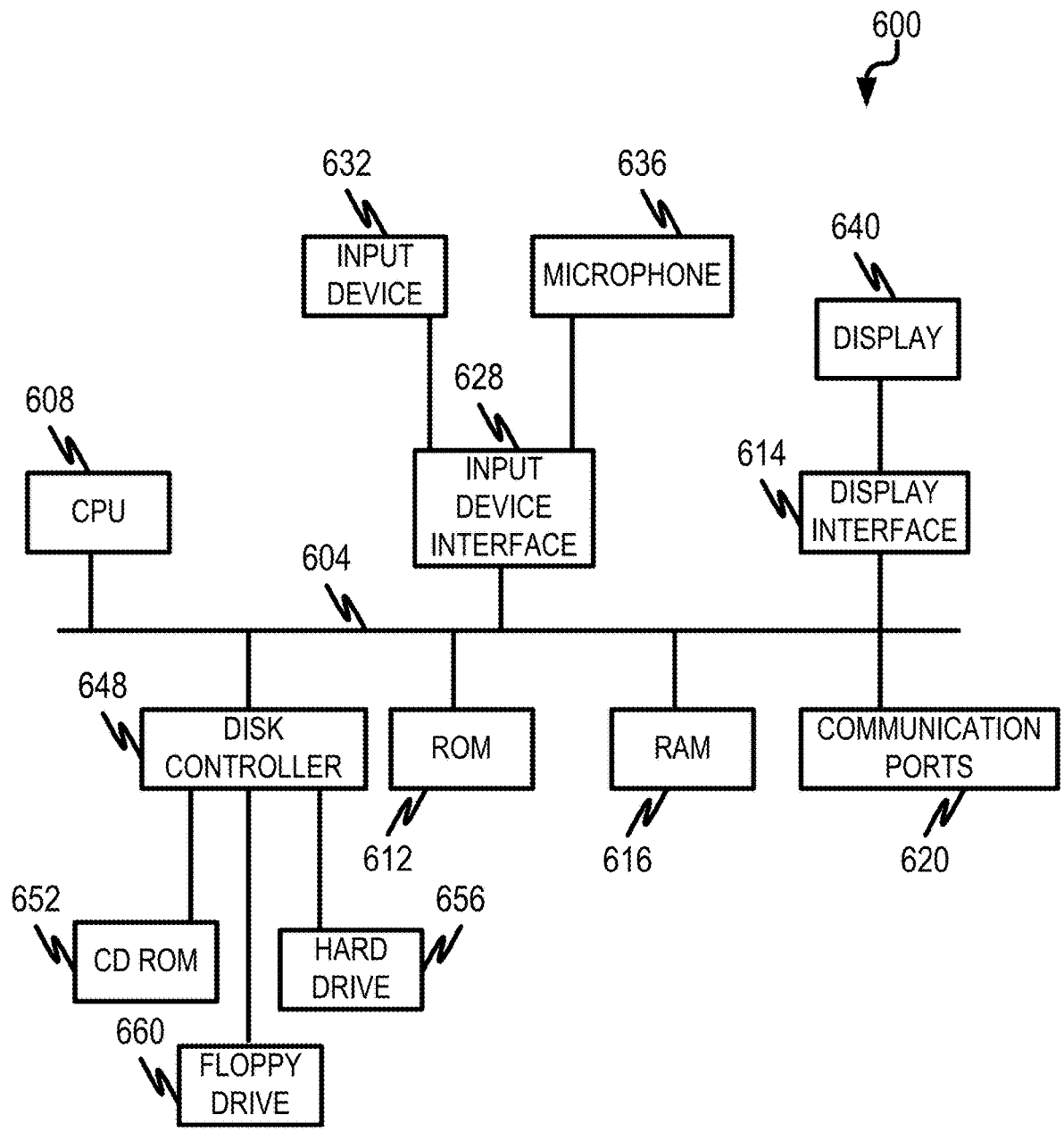
FIG. 6 is a diagram illustrating a sample computing device architecture for implementing various aspects described herein.

FIG. 6 is a diagram 600 illustrating a sample computing device architecture for implementing various aspects described herein. A bus 604 can serve as the information highway interconnecting the other illustrated components of the hardware. A processing system 608 labeled CPU (central processing unit) (e.g., one or more computer processors/data processors at a given computer or at multiple computers), can perform calculations and logic operations required to execute a program. A non-transitory processor-readable storage medium, such as read only memory (ROM) 612 and random access memory (RAM) 616, can be in communication with the processing system 608 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 648 can interface one or more optional disk drives to the system bus 604. These disk drives can be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the communication port 620 includes or otherwise comprises a network interface.

To provide for interaction with a user, the subject matter described herein can be implemented on a computing device having a display device 640 (e.g., a CRT (cathode ray tube) or LCD (liquid crystal display) monitor) for displaying information obtained from the bus 604 to the user and an input device 632 such as keyboard and/or a pointing device (e.g., a mouse or a trackball) and/or a touchscreen by which the user can provide input to the computer. Other kinds of input devices 632 can be used to provide for interaction with a user as well; for example, feedback provided to the user can be any form of sensory feedback (e.g., visual feedback, auditory feedback by way of a microphone 636, or tactile feedback); and input from the user can be received in any form, including acoustic, speech, or tactile input. In the input device 632 and the microphone 636 can be coupled to and convey information via the bus 604 by way of an input device interface 628. Other computing devices, such as dedicated servers, can omit one or more of the display 640 and display interface 614, the input device 632, the microphone 636, and input device interface 628.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for determining discriminatory data patterns implemented by one or more data processors forming one or more computing devices, the method comprising:

receiving, at a front end, a request for data specifying a data type;

retrieving, by a query handler from at least one database, data of the data type comprising a plurality of data records;

assigning, by the query handler, a classification attribute to each data record using a pre-defined classification policy stored in a policy store;

performing a statistical evaluation, by a discrimination detection engine, the classification attributes for the data to generate a mutual information metric, the mutual information metric quantifying interdependencies between two or more data records of the plurality of data records, wherein an upper bound of the mutual information metric is a minimum between a Shannon Entropy of two random variables; and generating, by the query handler, a listing of one or more discriminatory attributes and corresponding mutual information metric contributing to discriminatory data patterns based on the mutual information metric, indicating at least one interdependency between the two or more data records.

2. The method of claim 1, wherein the classification attributes comprise at least one of (i) a potentially discriminatory attribute comprising information identifying a protected group, (ii) a potentially non-discriminatory attribute comprising information unrelated to a protected group, or (iii) a decision attribute comprising predetermined decision information relating to the request.

3. The method of claim 2, wherein statistically evaluating the classification attributes comprises:

statistically estimating, by a direct discrimination engine of the discrimination detection engine, the mutual information metric based on the decision attributes and the potentially discriminatory attributes given the potentially non-discriminatory attributes; and comparing, by the direct discrimination engine, the one or more mutual information metrics to a predetermined threshold, wherein the listing further comprises the potentially discriminatory attributes when the mutual information metric exceeds the predetermined threshold.

4. The method of claim 2, wherein statistically evaluating the classification attributes comprises:

statistically estimating, by an indirect discrimination engine of the discrimination detection engine, the mutual information metric based on the decision attributes and the potentially non-discriminatory attributes; and comparing, by the indirect discrimination engine, the mutual information metric to a predetermined threshold, wherein the listing further comprises the potentially non-discriminatory attributes when the mutual information metric exceeds the predetermined threshold.

5. The method of claim 4, wherein statistically evaluating the classification attributes further comprises:

statistically estimating, by an external sources inference engine of the discrimination detection engine, the mutual information metric based on the decision attributes and the potentially discriminatory attributes stored in an external database; and comparing, by the external sources inference engine, the mutual information metric to a predetermined threshold, wherein the listing further comprises dependencies of the potentially discriminating attributes on external source data.

6. The method of claim 1, further comprising defining, by a user, the classification attributes of the pre-defined classification policy.

7. The method of claim 2, further comprising automatically defining, by an explanatory factors finder, the pre-defined classification policy by:

extracting unclassified attributes of the plurality of data records;

statistically estimating a mutual information metric based on the decision attributes;

comparing the mutual information metric to a predetermined threshold;

wherein the pre-defined classification policy comprises the unclassified attributes when the mutual information metric exceeds the predetermined threshold.

8. The method of claim 1, wherein the mutual information metric comprises a normalized mutual information metric.

9. A system for determining discriminatory data patterns, the system comprising:

at least one data processor;

memory storing instructions, which when executed by at least one data processor, result in operations comprising:

receiving, at a front end, a request for data specifying a data type;

retrieving, by a query handler from at least one database, data of the data type comprising a plurality of data records;

assigning, by the query handler, a classification attribute to each data record using a pre-defined classification policy stored in a policy store;

performing a statistical evaluation, by a discrimination detection engine, the classification attributes for the data to generate a mutual information metric, the mutual information metric quantifying interdependencies between two or more data records of the plurality of data records, wherein an upper bound of the mutual information metric is a minimum between a Shannon Entropy of two random variables; and generating, by the query handler, a listing of one or more discriminatory attributes and corresponding mutual information metric contributing to discriminatory data patterns based on the mutual information metric, indicating at least one interdependency between the two or more data records.

10. The system of claim 9, wherein the classification attributes comprise at least one of (i) a potentially discriminatory attribute comprising information identifying a protected group, (ii) a potentially non-discriminatory attribute comprising information unrelated to a protected group, or (iii) a decision attribute comprising predetermined decision information relating to the request.

11. The system of claim 10, wherein statistically evaluating the classification attributes comprises:

statistically estimating, by a direct discrimination engine of the discrimination detection engine, the mutual information metric based on the decision attributes and the potentially discriminatory attributes given the potentially non-discriminatory attributes; and comparing, by the direct discrimination engine, the mutual information metric to a predetermined threshold, wherein the listing further comprises the potentially discriminatory attributes when the mutual information metric exceeds the predetermined threshold.

12. The system of claim 10, wherein statistically evaluating the classification attributes comprises:

statistically estimating, by an indirect discrimination engine of the discrimination detection engine, the mutual information metric based on the decision attributes and the potentially non-discriminatory attributes; and comparing, by the indirect discrimination engine, the mutual information metric to a predetermined threshold, wherein the listing further comprises the potentially non-discriminatory attributes when the mutual information metric exceeds the predetermined threshold.

13. The system of claim 12, wherein statistically evaluating the classification attributes further comprises:

statistically estimating, by an external sources inference engine of the discrimination detection engine, the mutual information metric based on the decision attributes and the potentially discriminatory attributes stored in an external database; and comparing, by the external sources inference engine, the mutual information metric to a predetermined threshold, wherein the listing further comprises dependencies of the potentially discriminating attributes on external source data.

14. The system of claim 12, further comprising defining, by a user, the classification attributes of the pre-defined classification policy.

15. The system of claim 10, further comprising automatically defining, by an explanatory factors finder, the pre-defined classification policy by:

extracting unclassified attributes of the plurality of data records;

statistically estimating a mutual information metric based on the decision attributes;

comparing the mutual information metric to a predetermined threshold;

wherein the pre-defined classification policy comprises the unclassified attributes when the mutual information metric exceeds the predetermined threshold.

16. The system of claim 9, wherein the mutual information metric comprises a normalized mutual information metric.

17. The system of claim 9, further comprising a columnar storage memory database storing the memory storing instructions.

18. The system of claim 9, wherein a columnar storage memory database comprises the memory storing instructions.

19. A non-transitory computer program product for determining discriminatory data patterns, the computer program product storing instructions which, when executed by one or more data processors forming one or more computing devices, result in operations comprising:
- receiving, at a front end, a request for data specifying a data type;
- retrieving, by a query handler from at least one database, data of the data type comprising a plurality of data records;
- assigning, by the query handler, a classification attribute to each data record using a pre-defined classification policy stored in a policy store;
- performing a statistical evaluation, by a discrimination detection engine, the classification attributes for the data to generate a mutual information metric, the mutual information metric quantifying interdependencies between two or more data records of the plurality of data records, wherein an upper bound of the mutual information metric is a minimum between a Shannon Entropy of two random variables; and
- generating, by the query handler, a listing of one or more discriminatory attributes relating to human resource data and corresponding mutual information metric contributing to discriminatory data patterns based on the mutual information metric, indicating at least one interdependency between the two or more data records.

20. The non-transitory computer program product of claim 19, wherein a columnar storage memory database comprises the instructions.

* * * * *